US011915669B2

(12) United States Patent
Vaucher

(10) Patent No.: US 11,915,669 B2
(45) Date of Patent: Feb. 27, 2024

(54) AUTOMATIC DISPLAY MODULATION BASED ON AUDIO ARTIFACT COMPOSITION

(71) Applicant: SoClip!, Bandol (FR)

(72) Inventor: Christophe Vaucher, Bandol (FR)

(73) Assignee: SoClip!, Bandol (FR)

( * ) Notice: Subject to any disclaimer, the term of this patent is extended or adjusted under 35 U.S.C. 154(b) by 89 days.

(21) Appl. No.: 17/749,389

(22) Filed: May 20, 2022

(65) Prior Publication Data

US 2022/0375429 A1 Nov. 24, 2022

Related U.S. Application Data

(60) Provisional application No. 63/191,220, filed on May 20, 2021.

(51) Int. Cl.

| | |
|---|---|
| ***G09G 5/10*** | (2006.01) |
| ***G10H 1/00*** | (2006.01) |
| ***G10H 1/36*** | (2006.01) |

(52) U.S. Cl.

CPC ............ *G09G 5/10* (2013.01); *G10H 1/0008* (2013.01); *G10H 1/368* (2013.01); *G09G 2320/0626* (2013.01)

(58) Field of Classification Search

CPC .... G09G 5/10; G09G 2320/0626; G09G 3/20; G10H 1/0008; G10H 1/368; G11B 27/034; G11B 27/34

See application file for complete search history.

(56) References Cited

U.S. PATENT DOCUMENTS

| | | | | |
|---|---|---|---|---|
| 2011/0292091 A1* | 12/2011 | Kondo | ................. | G01R 13/402 345/690 |
| 2017/0105081 A1* | 4/2017 | Jin | ........................... | G10H 1/00 |
| 2020/0013379 A1* | 1/2020 | Vaucher | ............... | G11B 27/031 |

* cited by examiner

*Primary Examiner* — Antonio Xavier

(74) *Attorney, Agent, or Firm* — Polsinelli

(57) ABSTRACT

The disclosed technology provides solutions for enhancing a user's experience of content playback, such as that of a user that is viewing multimedia content, such as a music video, on a mobile device. In some aspects, a process of the disclosed technology can include steps for receiving a mean energy curve associated with a sound file and dynamically modulating a brightness level of a displayed content on a display based on audio properties of the mean energy curve whereby an average brightness experienced over playback of the displayed content is equal to a default brightness of the display.

14 Claims, 10 Drawing Sheets

AUTOMATIC DISPLAY MODULATION BASED ON AUDIO ARTIFACT COMPOSITION

CROSS-REFERENCE TO RELATED APPLICATION

This application claims priority to U.S. Provisional Application No. 63/191,220 filed May 20, 2021, which is incorporated by reference herein in its entirety.

FIELD

The present invention generally relates to a method for automatically modulating the brightness level of a display screen and in particular, for improving a user viewing experience by automatically modulating brightness levels based on audio artifacts corresponding with a multimedia item that is concurrently shown to the user on the display screen, without attenuating the initial average level.

SUMMARY

Figure 1:
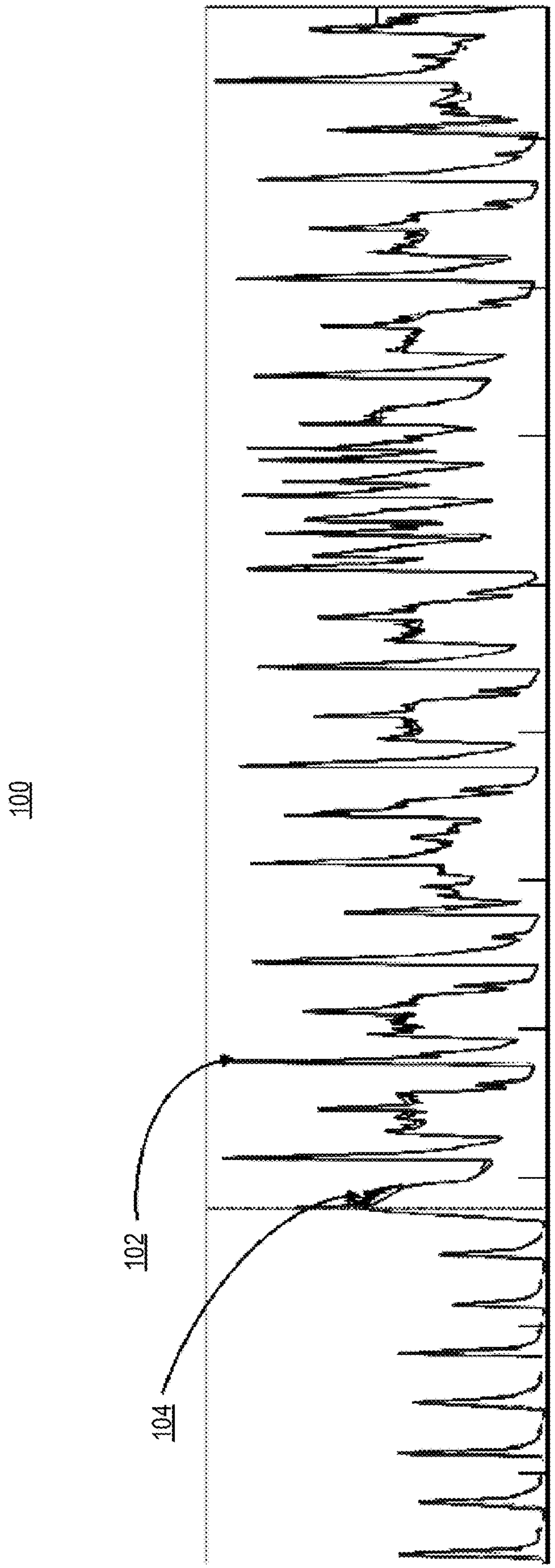
FIG. 1 conceptually illustrates an example graph of energy changes corresponding with a media file, according to some aspects of the disclosed technology.

Disclosed are systems, apparatuses, methods, computer-readable medium, and circuits for dynamically modulating a level of brightness based on audio properties. According to at least one example, a method includes: receiving a mean energy curve associated with a sound file; and modulating a brightness level of a displayed content on a display based on audio properties of the mean energy curve whereby an average brightness experienced over playback of the displayed content is equal to a default brightness of the display. For example, the program receives a mean energy curve associated with a sound file; and modulates a brightness level of a displayed content on a display based on audio properties of the mean energy curve whereby an average brightness experienced over playback of the displayed content is equal to a default brightness of the display.

In another example, a program for dynamically modulating a level of brightness based on audio properties is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the program to: receive a mean energy curve associated with a sound file; and modulate a brightness level of a displayed content on a display based on audio properties of the mean energy curve whereby an average brightness experienced over playback of the displayed content is based on a default brightness of the display.

DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Aspects of the disclosed technology provide solutions for enhancing a user's experience of content playback, such as that of a user that is viewing multimedia content, such as a music video, on a mobile device (e.g., a smartphone or tablet computing device). Although some of the examples described herein are discussed in relation to a mobile device, such as a smart phone, it is understood that the various aspects of the disclosed invention can be implemented on any device for which display parameters (e.g., brightness levels) can be adjusted.

In some aspects, the disclosed technology provides solutions for dynamically modulating the brightness level of a display based on audio properties corresponding with the displayed content, without attenuating it in the average. By way of example, the brightness levels of the display can be increased or decreased in response to audio fluctuations, such as changes to various parameters (e.g., such as volume or power) for corresponding audio content. For example, display brightness can be intensified in response to increases in volume levels; similarly, brightness levels can be diminished in response to decreases in multimedia volume levels. In other aspects, brightness levels can be configured to fluctuate in a manner that corresponds with the playback of specific audible artifacts, such as in response to the playback of specific sounds, sound combinations, and/or notes for various instrument types, e.g., drum hits, chords, and/or riffs, etc.

In some aspects, audio data for a multimedia item, such as a music video, can be analyzed in advance of playback, for example, to pre-determine the time positions of various audio events (e.g., drum hits, chords, and/or riffs, etc.). In some implementations, these audio parameters, together with their corresponding time-index information, can be represented as vectors or numeric arrays. Additional details regarding processes for analyzing and identifying audio artifacts in a musical composition (e.g., an audio file) are discussed in relation to U.S. application Ser. No. 16/503,379, entitled "BEAT DECOMPOSITION TO FACILITATE AUTOMATIC VIDEO EDITING," which is herein incorporated by reference in its entirety.

As discussed in further detail below, changes to display properties can be user configurable. For example, the magnitude and/or type of display change can be based on user selectable parameters, and/or may be dependent on other user configurable options. For example, display response can be a function of parameters implemented by user configurable skin options that correspond with the playback of a particular media item, media type, and/or media collection (e.g., a playlist, etc.). Further details regarding the use of user customizable skins are discussed in relation to U.S. application Ser. No. 16/854,062, entitled "AUTOMATED AUDIO-VIDEO CONTENT GENERATION," which is herein incorporated by reference in its entirety.

In operation, an automatic brightness modulation process of the disclosed technology can be based on a number of factors including, but not limited to, a default screen brightness of the displaying device (e.g., a user's smartphone) as well as calculations of average energy for one or more audio channels of audio content played on the device. Depending on the desired implementation, calculations of mean energy can be performed at different time-granularities or intervals. By way of example, mean energy (or mean amplitude/volume) may be calculated for a given audio channel or for the entire song, at an interval of a few hundred milliseconds, e.g., 200-400 ms. However, smaller (or greater) time granularities may be implemented, without departing from the scope of the disclosed technology.

Although mean energy calculations can be performed differently, depending on the desired implementation, in some aspects, the mean energy curve (e.g., SoundFlow(t) 102) can be computed by a process that includes the selection (picking) of various peaks, for example, to help accurate discretization of the curve in further steps, which is needed to avoid having too many points used to describe the SoundFlow curve, that would increase the computational loads experienced by the SDK. Once peak picking has been performed, additional mathematical functions may also be applied 1) to the peaks to increase contrast, such a Power function $y=x^{\alpha}$, where $\alpha$ is typically lower than "1"; 2) to interpolate the peaks with smoother functions, such as exponential functions. In some aspects, a minimum temporal distance between peaks may be used, for example, to remove peaks that are too close together. The chosen temporal distance between selected peaks can be based on the tempo of the sound file. For example, the inter-peak distance can be a fraction of the song's tempo. Additionally, in some implementations, remaining peaks can be flattened, for example, to ensure that they last at least one video frame, e.g., 16.6 milliseconds at 60 frames-per-second. In some aspects, some peaks may be removed from the curve, e.g., if they are too close together, or do not contain useful energy curve information. Peak removal can be used to improve processing by reducing computational loads experienced by the SDK.

In some aspects, the screen brightness level can be automatically modulated to follow the average energy envelop for audio waveforms that are to be played on the device. As such, screen brightness levels, as well as determinations of various energy properties/statistics can be performed on an item-by-item bases, e.g., on a song-by-song, or video-by-video basis. By modulating the screen brightness level, the brightness can be automatically increased (or decreased) in response to changes to various audio parameters (e.g., volume or energy), as the media item is played. By normalizing the mean energy curve 102 to fall within the range of 0 to 1, the average value over the duration of the song is most likely to be less than 1, meaning that the average brightness during the songs' duration can be lower than the default brightness setting of the display. Because having an overall lower brightness setting can degrade the user experience, a correction (or offset) can be applied to the display brightness at the outset of media playback. For example, the display's default brightness can be initially increased so that the average brightness experienced over the course of the media playback is based on, or equal to (or approximately equal to wherein they differ by less than a maximum threshold), the default brightness value of the display.

It can be observed on a large set of songs that the average value of the SoundFlow curve is typically close to "0.5". Thus, a way to offset the average attenuation on a given song would be to apply a constant factor, typically "2" (e.g., "1" divided by "0.5"), SoundFlow(t) at each time position. This first method is also claimed here, though it will not be enough to make sure users' experience is always optimal.

If one wants to be more accurate, the applied correction must be different for every media item (song) that is played. For example, each song may be associated with a unique dynamic coefficient that is configured to compensate the initial SoundFlow attenuation over the duration of the song, thereby keeping the average brightness at the same level (or within a close/approximate range) of the value set by the smartphone settings. As such, the pre-calculation of average SoundFlow(t) for a given media file (or song) can be used to compensate the average brightness level experienced by the user over the duration of media playback. Specific details regarding the calculations of screen brightness levels are discussed in further detail, below.

FIG. 1 illustrates an example graph 100 of energy changes corresponding with a media file (e.g., a song), according to some aspects of the disclosed technology. In particular, FIG. 1 illustrates an average (mean) waveform energy curve 104 for a given song, as well as the mean energy curve 102 for the song.

Figure 2:
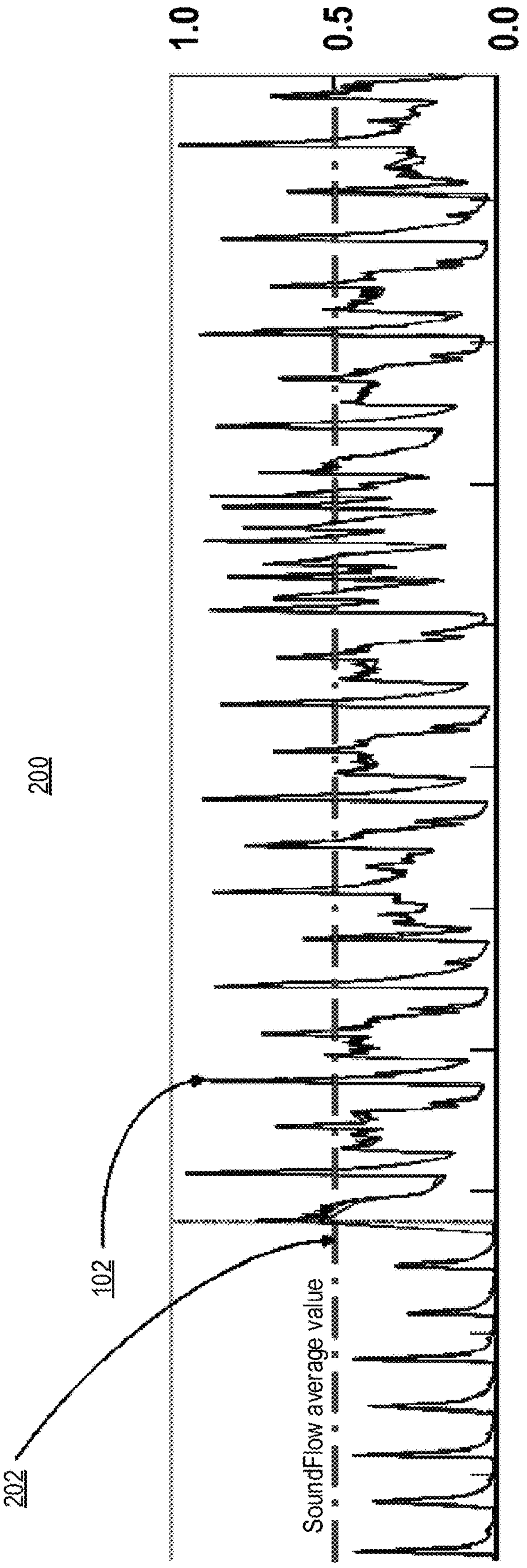
FIG. 2 conceptually illustrates an audio file's energy profile curve, with an overall average that represents an average value across the time duration of the media file for the audio file's energy profile curve, according to some aspects of the disclosed technology.

In some aspects, an overall average (mean) can be calculated for the entire song mean energy values at different points in time throughout. By way of example, FIG. 2 illustrates the mean energy curve 102, with an overall average 202 that represents an average value ("0.5" here) across the time duration of the media file for the SoundFlow curve 102. In some aspects, the mean energy curve 102 for the media file can be normalized to pre-determined value range, such as between 0 and 1, as illustrated in the examples of FIGS. 1 and 2.

Additionally, the initial screen brightness can be more or less modulated by the SoundFlow curve by applying a SoundFlow level (SF_LVL, ranging between 0 and 1). Such SF_LVL is typically pre-set inside a SKIN.

The final $\text{brightness}_1(t)$ applied to the smartphone screen can be then calculated using the relationship provided by equation 1, where:

$$\text{Brightness}_1(t)=1+SF\_LVL*(\text{SoundFlow}(t)-1)) \quad (1)$$

For example, using a configurable parameter (e.g., SF_LVL), the screen brightness can be kept constant (by setting the parameter to '0'), or the screen brightness can be made to follow the energy curve envelop of the media content item (by setting the parameter to '1').

Using the above configuration parameter (SF_LVL), the average brightness over the duration of the media file can be represented using equation 2, where:

$$\text{Mean}(\text{Brightness}_1)=1+SF\_LVL*[\text{Mean}(\text{SoundFlow}(t))-1] \quad (2)$$

As discussed above, sensible adjustment of the brightness at the outset of media playback can used to keep the average display brightness at a level that is equal (or proximate to)

the default brightness of the display device, such as a default brightness as indicated by settings on a smart phone.

In some aspects, the pre-calculation of the audio file's energy profile (i.e., SoundFlow(t)) can be used to compensate the instantaneous screen brightness so that it does not attenuate the average brightness over the song, as given by equation 3:

$$\text{Brightness}_2(t) = \frac{\text{Brightness}_1(t)}{1 + \text{SF\_LVL} * [\text{Mean(soundflow)} - 1]} = \frac{[1 + \text{SF\_LVL} * (\text{soundflow})(t) - 1)]}{1 + \text{SF\_LVL} * [\text{Mean(soundflow)} - 1]} \quad (3)$$

where $\text{Brightness}_2(t)$ represents the instantaneous compensated brightness at time t>0. Using $\text{Brightness}_2(t)$, the screen brightness of a smartphone can be modulated based on the SoundFlow(t) curve, whose curve can be attenuated by an additional parameter SF_LVL, with no attenuation in the average over the song, in regard of the brightness set in the smartphone settings:

Indeed, $\text{Mean}[\text{Brightness}_2(t)]=\text{Mean}[1+SF\_LVL^*(\text{SoundFlow}(t)-1)]/[1+SF\_LVL^*[\text{Mean}(\text{SoundFlow}(t))-1]=1$ By construction, $\text{Mean}[\text{Brightness}_2(t)]=1$ over the song, thereby substantially enhancing the users' experience 1) first by synchronizing the brightness modulation with the local energy envelop (e.g. local volume or power) of any song, and 2) while not attenuating the average brightness as set in the smartphone settings.

In some aspects, the brightness (e.g., lumin) can be calculated as follows:

```
  alpha = 1/(1+intensity*(SF_mean-1));
  if (SF_modul <=SF_mean) || (alpha<(1+e))
    lumin = (1+intensity*(SF_modul-1))/(1+intensity*(SF_mean-1));
  else
  lumin = 1+e*(1-(1-(SF_modul-SF-mean)/(1-SF_mean))^(intensity*alpha*(1-
SF_mean)/e));
  end
  b = b*SF_mean;
  beta = min(b,1-b);
  if SF_modul < b
    sigmoid = 1/2*(SF_modul/b)^(2*b*(a+1/(2*beta)));
  else sigmoid = 1-1/2*((1-SF_modul)/(1-b))^(2*(1-b)*(a+1/(2*beta)));
  end
  lumin = lumin*sigmoid;
  end
```

The parameters that can be change are "a", "b", and "e". The parameter "a" controls sigmoid stiffness at an inflection point. The parameter "b" controls the sigmoid inflection point as a fraction of SF_mean, between 0 (excluded) and 1 (excluded). Examples are given on FIG. 3C. The parameter "e" represents a percentage of overshoot above 1 that is allowed, as shown in FIG. 3E Furthermore, when intensity=1, the amplitude of the effect is maximum. When SF modulated (e.g., SF_modul) >SF modulated mean (e.g., SF_mean), luminosity>1 (as long as intensity×0), i.e. the rendering is lighten. When SF modulated<SF modulated mean luminosity<1 (as long as intensity×0), i.e. the rendering is darkened.

By construction, the calculation above also has the following property: the mean (over the entire duration of the sound file) of luminosity is approximately equal to 1 (because average numerator approximately equals average denominator).

When SF modulated is close to 0 whatever the value of intensity, luminosity must be close to 0 (i.e. no signal=>black screen). This constraint is contradictory with the current behavior: intensity=0=>luminosity=1, thus only with the property: average(luminosity)=1. However, the average property (luminosity)=1 needs to remain approximately true, typically +1-10% close. As such, the value of intensity needs to be limited by a value greater than u constant b (typically 1.5) to avoid distorting the rendering. However, the "Min Lightness" parameter allows to have brightness not equal to zero when SoundFlow equals "0", as shown in FIG. 3F.

In some aspects, the average brightness over the song might be increased or lowered, not necessarily kept to exact value of the one set in the smartphone settings.

As a first approximation, the average brightness over the song might also be calculated the following way:

$$\text{Brightness}_3(t) = \frac{[1 + \text{SF\_LVL} * (\text{SoundFlow}(t) - 1)]}{1 + \text{SF\_LVL} * (a - 1)}$$

where "a" is constant parameter typically close to "0.5". In this case, there is no need to calculate the average value of SoundFlow curve for each song. It is here approximated to a value typically equal to "0.5".

As a first approximation, the average brightness over the song might also be calculated the following way:

$$\text{Brightness}_4(t)=1+SF\_LVL^*[b^*\text{SoundFlow}(t)-1)]$$

where "b" is constant parameter typically close to "2". In this case, there is no need to calculate the average value of SoundFlow curve for each song: It is here approximated to a value typically equal to "0.5".

Figure 3A:
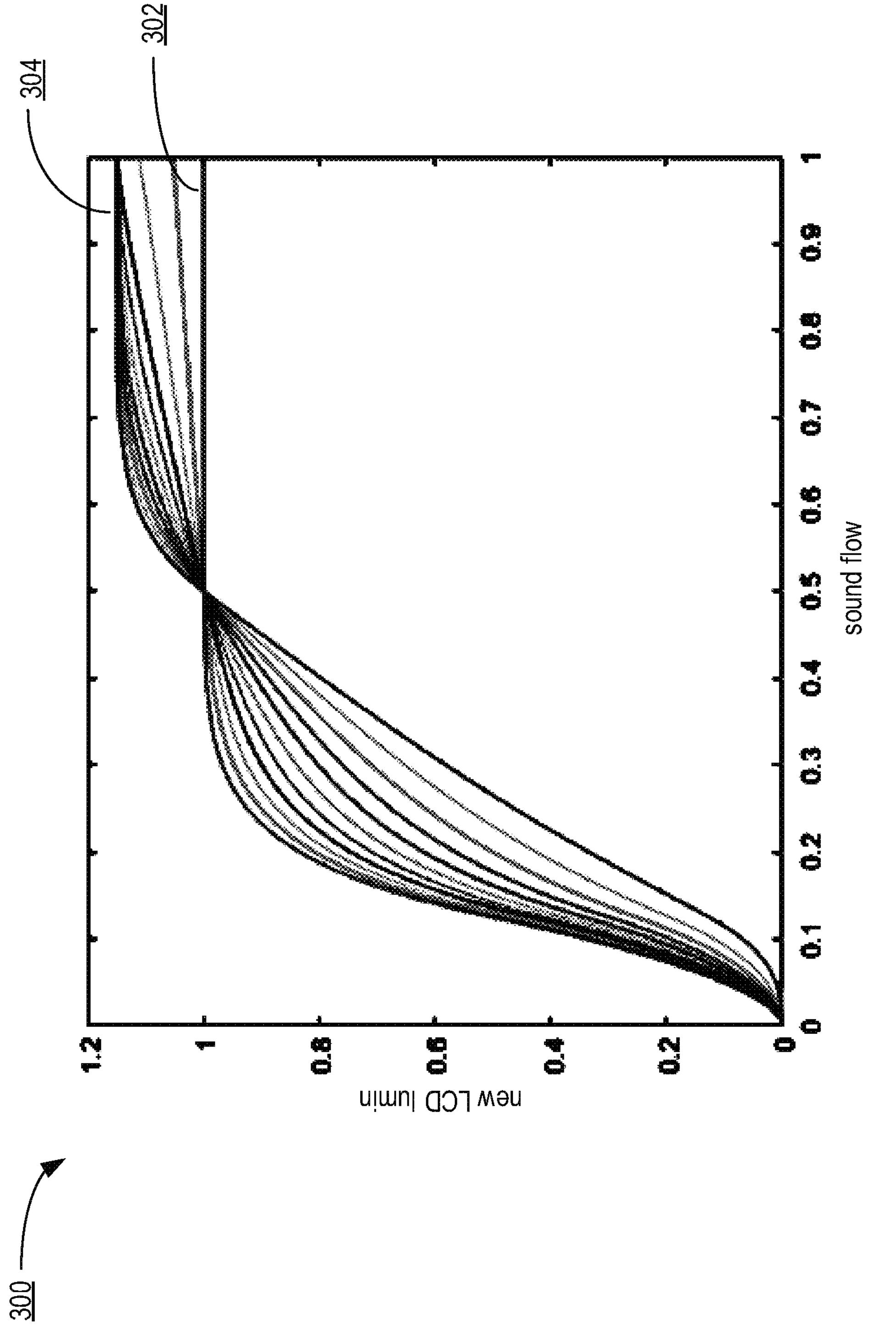
FIG. 3A illustrates an example graph of an audio file's energy profile plotted against screen brightness, according to some aspects of the disclosed technology.

FIG. 3A illustrates an example graph 300 of an audio file's energy profile plotted against screen brightness, according to some aspects of the disclosed technology. In some aspects, the pre-calculation of the audio file's energy profile (i.e., SoundFlow(t)) can be used to compensate for the instantaneous screen brightness so that it does not attenuate the average brightness over the song, as provided by the equations above. The graph 300 illustrates that an increased energy of sound correlates to an increased brightness for a displayed content following a curve that flattens out. In FIG. 3, the graph 300 illustrates that a first line 302 flattens out a 1 while a second line flattens out a 1.15. The parameter "e" as mentioned above controls how much above 1 the line flattens out. In other words, a maximum brightness can be higher than one with an asymptotic value setting based on the parameter "e".

FIGS. 3B-3F illustrate example settings for customizing the audio file's energy profile. The customization of the audio file's energy profile can be based on changing the intensity, flip point, max over exposure, and min lightness. Adjustment of brightness contrast may be achieved by compressing the energy envelop of the audio signal, which is typically uses a power function. For weaker audio signals, the mean energy curve value should stay closer to zero, resulting in a sensibly black display. However, whatever the input signal, which varies between 0 and 1, the SoundFlow application to the audio signal must maintain an average value close to 1 for the screen brightness.

Figure 3B:
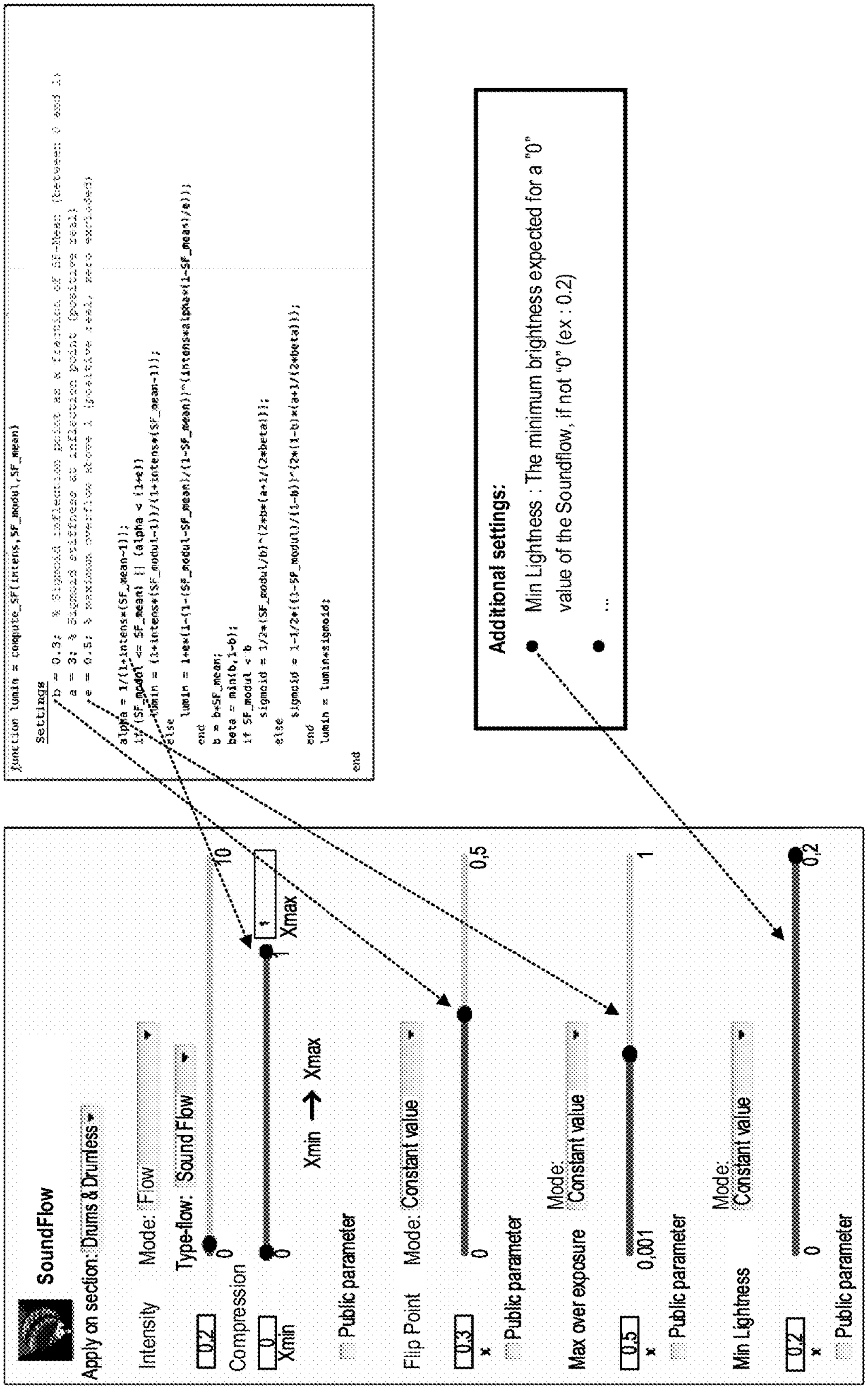
FIG. 3B-3F illustrate example settings for customizing the audio file's energy profile, according to some aspects of the disclosed technology.

Referring to FIG. 3B and the calculations above solving for brightness (lumin), "intensity" is based on the customizable setting of the "intensity" between 0 and 1. The "b" refers to the customizable setting of the flip point, which is the sigmoid inflection point as a fraction of SF_Mean (between 0 and 1). The "e" refers to maximum over exposure set between 0.001 and 1. The min lightness is expected for a "0" value of the mean energy curve, if not "0", e.g. 0.2.

Figure 3C:
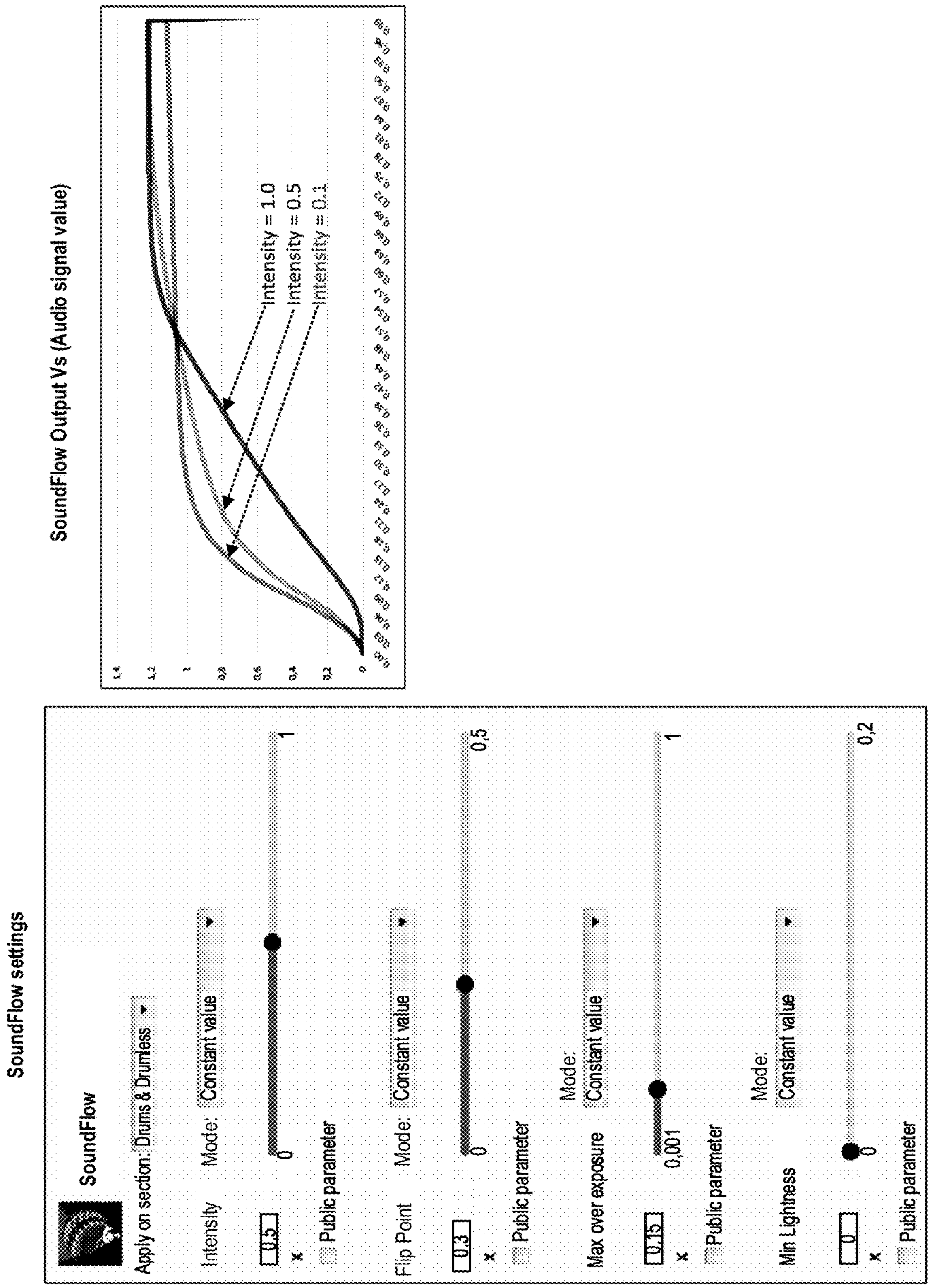
Figure 3D:
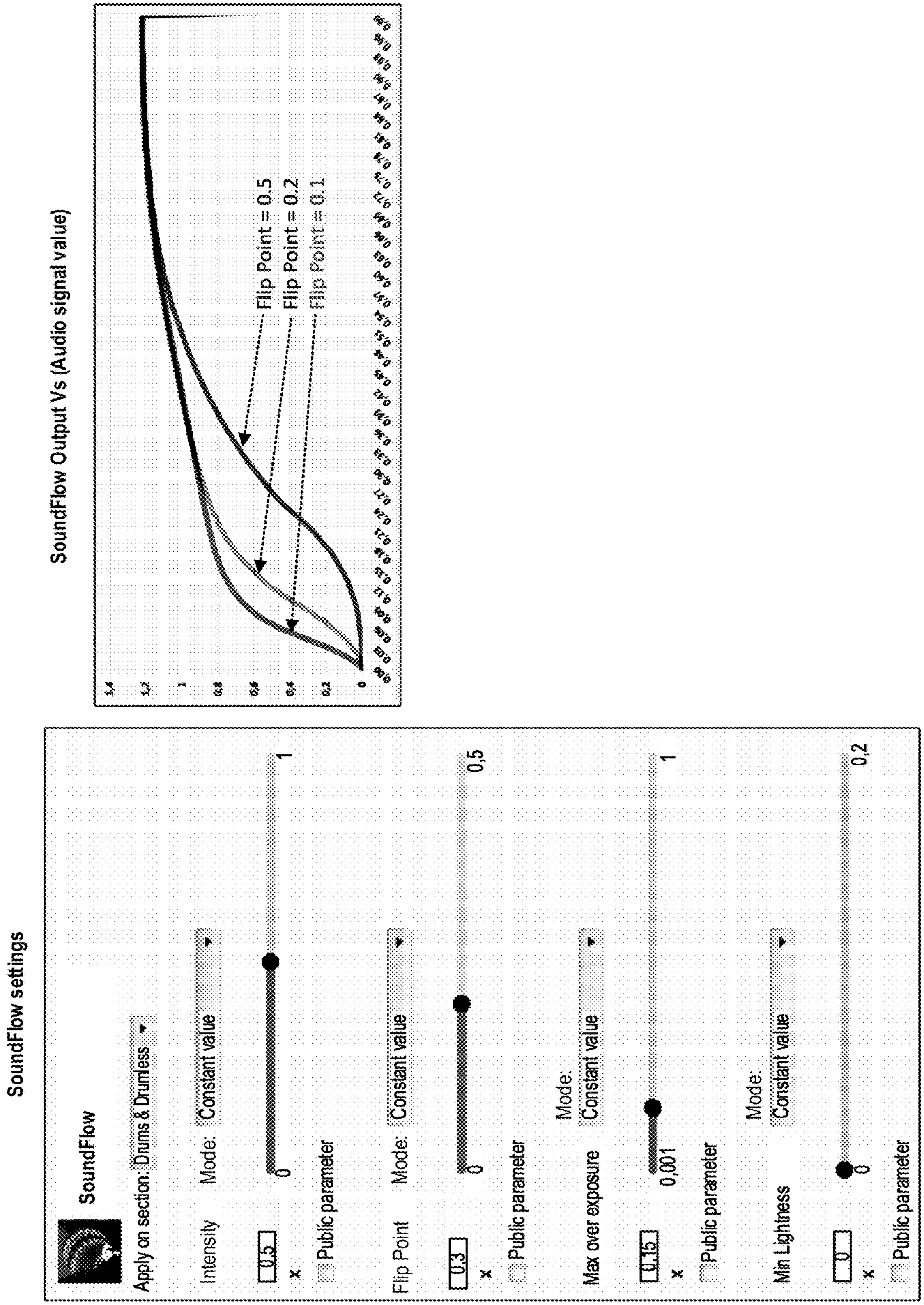
Figure 3E:
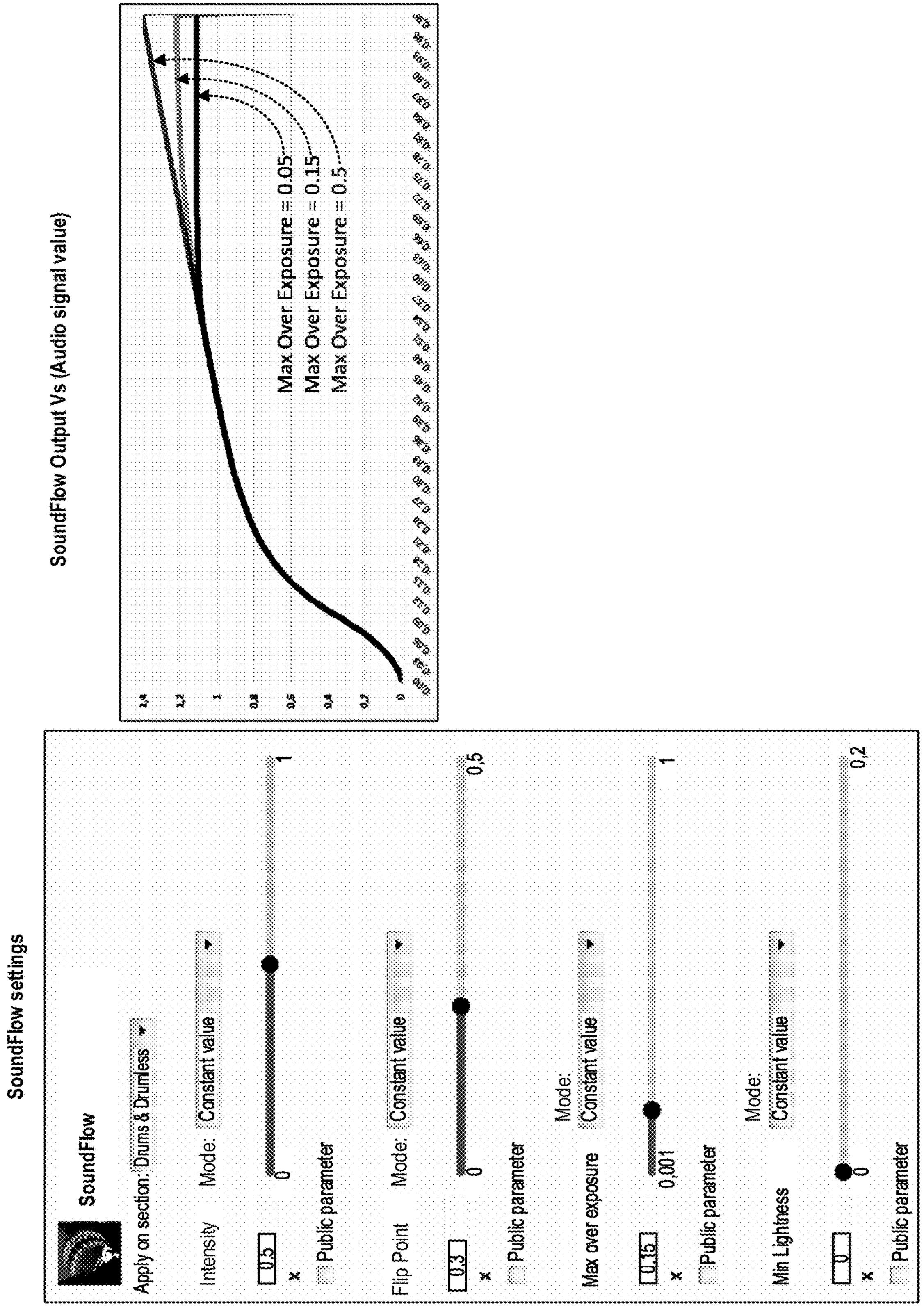
Figure 3F:
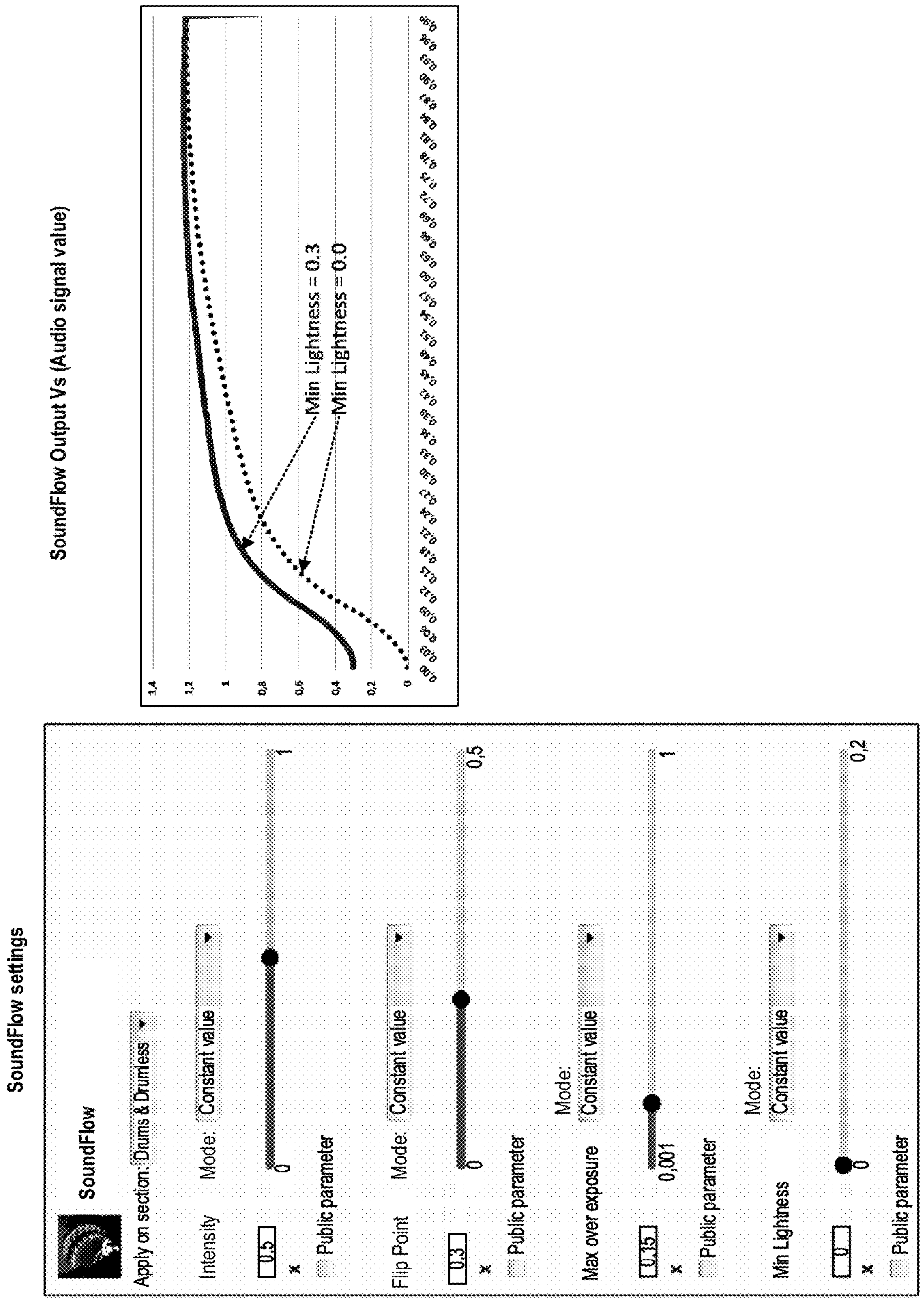

FIG. 3C illustrates what the mean energy curve differs when the intensity is different, namely between an intensity of 1, 0.5, and 0.1. FIG. 3D illustrates what the mean energy curve differs when the flip point is different, namely between the flip point set at 0.5, 0.2, and 0.1. FIG. 3E illustrates what the mean energy curve differs when the max over exposure is different, namely between the max over exposure set at 0.05, 0.15, and 0.5. FIG. 3F illustrates what the mean energy curve differs when the min lightness is different, namely between the min lightness set at 0.3 versus 0.0.

Figure 4:
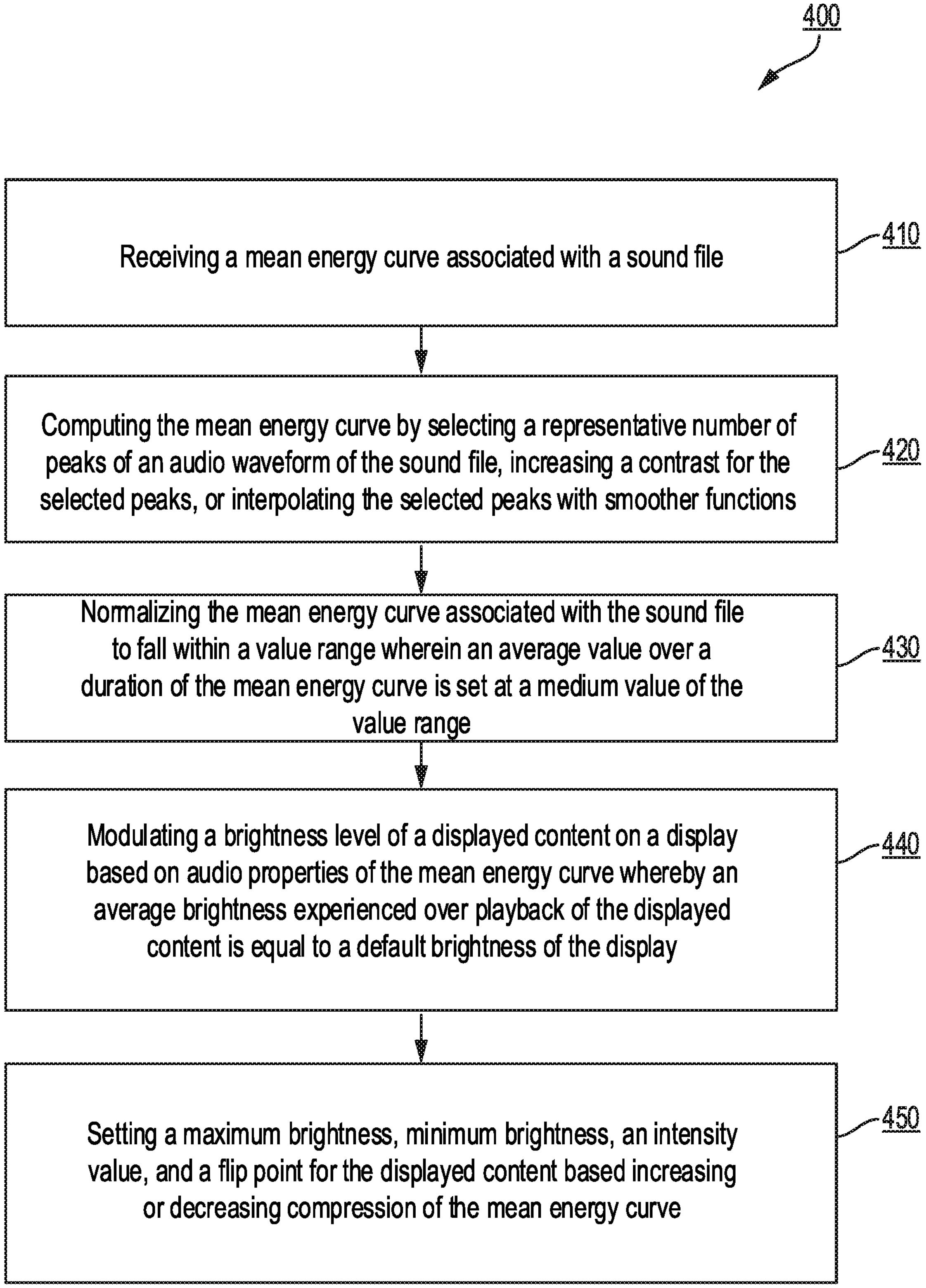
FIG. 4 illustrates an example process for dynamically modulating a level of brightness based on audio properties, according to some aspects of the disclosed technology.

FIG. 4 illustrates an example process on dynamically modulating a level of brightness based on audio properties. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes receiving a mean energy curve associated with a sound file at block 410. For example, the processor 510 illustrated in FIG. 5 may receive a mean energy curve associated with a sound file.

According to some examples, the method includes computing the mean energy curve by selecting a representative number of peaks of an audio waveform of the sound file, increasing a contrast for the selected peaks, or interpolating the selected peaks with smoother functions at block 420. For example, the processor 510 illustrated in FIG. 5 may compute the mean energy curve by selecting a representative number of peaks of an audio waveform of the sound file, increasing a contrast for the selected peaks, or interpolating the selected peaks with smoother functions. A minimum temporal distance between peaks that is based on a tempo of the sound file is used to remove packed peaks.

According to some examples, the method includes normalizing the mean energy curve associated with the sound file to fall within a value range wherein an average value over a duration of the mean energy curve is set at a medium value of the value range at block 430. For example, the processor 510 illustrated in FIG. 5 may normalize the mean energy curve associated with the sound file to fall within a value range wherein an average value over a duration of the mean energy curve is set at a medium value of the value range. Playback of the displayed content correlates to playback of the sound file.

According to some examples, the method includes modulating a brightness level of a displayed content on a display based on audio properties of the mean energy curve whereby an average brightness experienced over playback of the displayed content is based on or equal to a default brightness of the display at block 440. For example, the processor 510 illustrated in FIG. 5 may modulate a brightness level of a displayed content on a display based on audio properties of the mean energy curve whereby an average brightness experienced over playback of the displayed content is equal to a default brightness of the display. The audio properties include an increase in volume level, or a playback of a specific sound, sound combination, or notes for various instrument types.

According to some examples, the method includes setting a maximum brightness, minimum brightness, an intensity value, and a flip point for the displayed content based on increasing or decreasing compression of the mean energy curve at block 450. The flip point may limit the range of brightness by increasing or decreasing an amount of energy drop requires before dimming occurs. For example, using a flip point closer to zero can avoid a luminance signal from not becoming too dark too soon. For example, the processor 510 illustrated in FIG. 5 may set a maximum brightness, minimum brightness, an intensity value, and a flip point for the displayed content based increasing or decreasing compression of the mean energy curve.

According to some examples, the method includes offsetting an average attenuation by applying a unique dynamic coefficient that is configured to compensate for an initial attenuation over the duration of the sound file at each time position. For example, the processor 510 illustrated in FIG. 5 may offset an average attenuation by applying a unique dynamic coefficient that is configured to compensate for an initial attenuation over the duration of the sound file at each time position.

According to some examples, the method includes compensating the average brightness experienced by a user over a duration of media playback with a pre-calculation of an average mean energy curve for the sound file. For example, the processor 510 illustrated in FIG. 5 may compensate the average brightness experienced by a user over a duration of media playback with a pre-calculation of an average mean energy curve for the sound file. The average brightness experienced over playback of the displayed content may be equal to or differ by less than a maximum threshold amount from a default brightness of the display.

Figure 5:
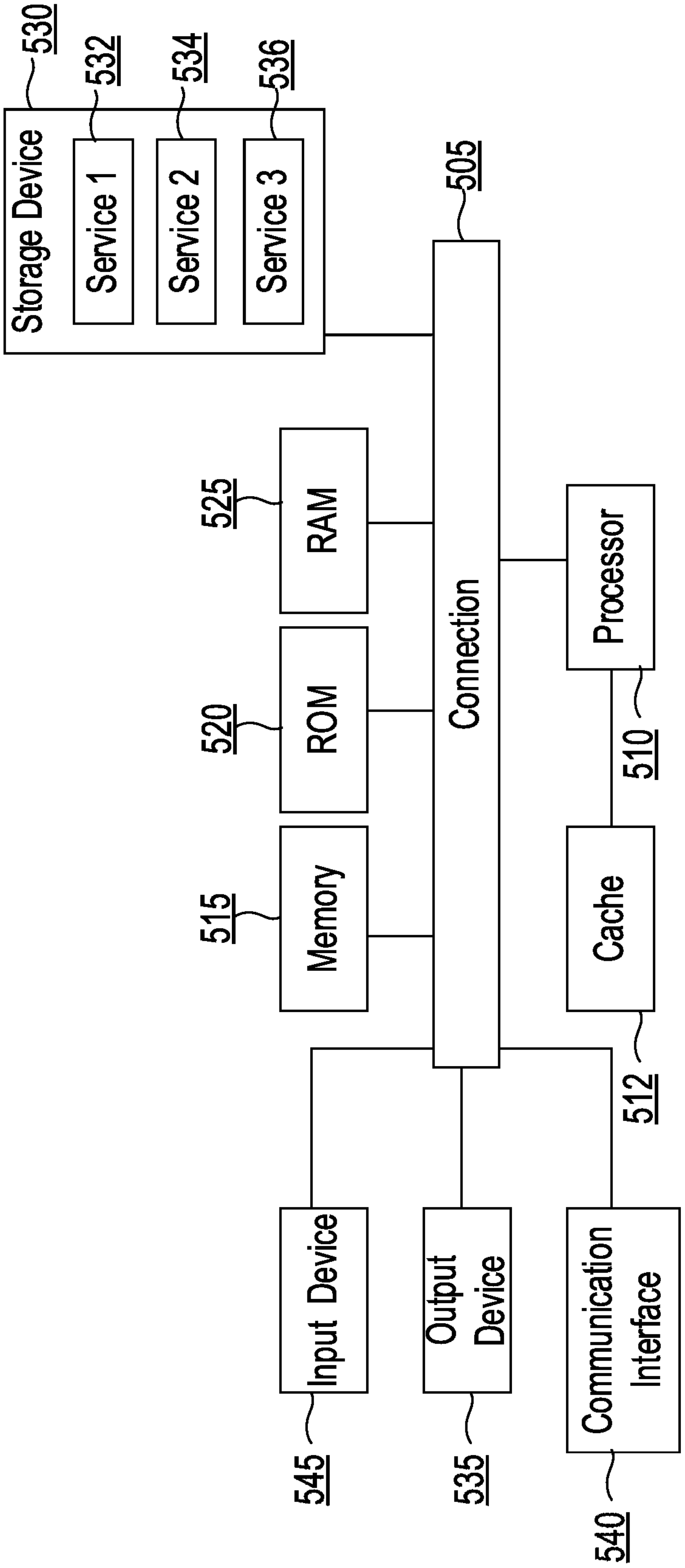
FIG. 5 illustrates an example processor-based system with which some aspects of the subject technology can be implemented.

FIG. 5 illustrates an example processor-based system with which some aspects of the subject technology can be implemented. For example, processor-based system 500 that can be any computing device that is configured to generate and/or display customized video content for a user and/or which is used to implement all, or portions of, a multimedia editing/playback platform, as described herein. By way of example, system 500 can be a personal computing device, such as a smart phone, a notebook computer, or a tablet computing device, etc. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, and/or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory computer-readable memory device and can be a hard disk or other types of computer-readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

What is claimed is:

1. A computer-implemented method, comprising:

receiving a mean energy curve associated with a sound file;

computing the mean energy curve by selecting a representative number of peaks of an audio waveform of the sound file, increasing a contrast for the selected peaks, or interpolating the selected peaks with smoother functions, wherein a minimum temporal distance between peaks that is based on a tempo of the sound file is used to remove packed peaks;

normalizing the mean energy curve associated with the sound file to fall within a value range wherein an average value over a duration of the mean energy curve is set at a medium value of the value range; and dynamically modulating a brightness level of a displayed content on a display based on audio properties of the mean energy curve whereby an average brightness experienced over playback of the displayed content is based on a default brightness of the display, wherein playback of the displayed content correlates to playback of the sound file.

2. The computer-implemented method of claim 1, further comprising:

offsetting an average attenuation by applying a unique dynamic coefficient that is configured to compensate for an initial attenuation over the duration of the sound file at each time position.

3. The computer-implemented method of claim 1, wherein the audio properties include an increase in volume level, or a playback of a specific sound, sound combination, or notes for various instrument types.

4. The computer-implemented method of claim 1, further comprising:

compensating the average brightness experienced by a user over a duration of media playback with a pre-calculation of an average mean energy curve for the sound file, wherein average brightness experienced over playback of the displayed content is equal to a default brightness of the display.

5. The computer-implemented method of claim 1, further comprising:

setting a maximum brightness, minimum brightness, an intensity value, and a flip point for the displayed content based increasing or decreasing compression of the mean energy curve.

6. A system comprising:

one or more processors; and a computer-readable medium coupled to the processors, the computer-readable medium comprising instructions stored therein, which when executed by the processors, cause the processors to perform operations comprising:

receiving a mean energy curve associated with a sound file;

computing the mean energy curve by selecting a representative number of peaks of an audio waveform of the sound file, increasing a contrast for the selected peaks, or interpolating the selected peaks with smoother functions, wherein a minimum temporal distance between peaks that is based on a tempo of the sound file is used to remove packed peaks;

normalizing the mean energy curve associated with the sound file to fall within a value range wherein an average value over a duration of the mean energy curve is set at a medium value of the value range; and dynamically modulating a brightness level of a displayed content on a display based on audio properties of the mean energy curve whereby an average brightness experienced over playback of the displayed content is based on a default brightness of the display, wherein playback of the displayed content correlates to playback of the sound file.

7. The system of claim 6, wherein the processors are further configured to execute operations comprising:

offsetting an average attenuation by applying a unique dynamic coefficient that is configured to compensate for an initial attenuation over the duration of the sound file at each time position.

8. The system of claim 6, wherein the audio properties include an increase in volume level, or a playback of a specific sound, sound combination, or notes for various instrument types.

9. The system of claim 6, wherein the processors are further configured to execute operations comprising:

compensating the average brightness experienced by a user over a duration of media playback with a pre-calculation of an average mean energy curve for the sound file, wherein average brightness experienced over playback of the displayed content is equal to a default brightness of the display.

10. The system of claim 6, wherein the processors are further configured to execute operations comprising:

setting a maximum brightness, minimum brightness, an intensity value, and a flip point for the displayed content based increasing or decreasing compression of the mean energy curve.

11. A non-transitory computer-readable storage medium having instructions embodied thereon, wherein the instructions are executable by a processor to perform operations comprising:

receiving a mean energy curve associated with a sound file;

computing the mean energy curve by selecting a representative number of peaks of an audio waveform of the sound file, increasing a contrast for the selected peaks, or interpolating the selected peaks with smoother functions, wherein a minimum temporal distance between peaks that is based on a tempo of the sound file is used to remove packed peaks;

normalizing the mean energy curve associated with the sound file to fall within a value range wherein an average value over a duration of the mean energy curve is set at a medium value of the value range; and dynamically modulating a brightness level of a displayed content on a display based on audio properties of the mean energy curve whereby an average brightness experienced over playback of the displayed content is based on a default brightness of the display, wherein playback of the displayed content correlates to playback of the sound file.

12. The non-transitory computer-readable storage medium of claim 11, wherein the instructions are executable by the processor to further perform operations comprising:

offsetting an average attenuation by applying a unique dynamic coefficient that is configured to compensate for an initial attenuation over the duration of the sound file at each time position.

13. The non-transitory computer-readable storage medium of claim 11, wherein the audio properties include an increase in volume level, or a playback of a specific sound, sound combination, or notes for various instrument types.

14. The non-transitory computer-readable storage medium of claim 11, wherein the instructions are executable by the processor to further perform operations comprising:

compensating the average brightness experienced by a user over a duration of media playback with a pre-calculation of an average mean energy curve for the sound file, wherein average brightness experienced over playback of the displayed content is equal to a default brightness of the display.

* * * * *